(12) United States Patent
Johnson

(10) Patent No.: US 6,293,601 B1
(45) Date of Patent: Sep. 25, 2001

(54) TELESCOPING HOOK DEVICE

(76) Inventor: Nancy J. Johnson, 152 N. 6262 Pontiac Dr., Menomonee Falls, WI (US) 53051

( * ) Notice: Subject to any disclaimer, the term of this patent is extended or adjusted under 35 U.S.C. 154(b) by 0 days.

(21) Appl. No.: 09/612,084

(22) Filed: Jul. 7, 2000

(51) Int. Cl.⁷ .................................................. B25J 1/00
(52) U.S. Cl. ............................................ 294/26; 294/19.1
(58) Field of Search ................................. 294/3.6, 19.1, 294/19.2, 22, 23.5, 24, 26, 65.5; 43/5; 403/104, 109

(56) References Cited

U.S. PATENT DOCUMENTS

| | | |
|---|---|---|
| D. 385,009 | 10/1997 | Adams et al. . |
| 1,339,257 * | 5/1920 | Callahan ............................ 294/26 X |
| 1,686,889 | 10/1928 | Woods . |
| 2,372,743 | 4/1945 | Schofield . |
| 3,101,964 * | 8/1963 | Reaser ................................ 294/26 X |
| 3,384,408 * | 5/1968 | Furzey ................................ 294/65.5 |
| 4,160,563 | 7/1979 | Whitney . |
| 4,395,840 * | 8/1983 | Banks .............................. 294/19.1 X |
| 4,547,989 | 10/1985 | Karlsson . |
| 4,574,512 * | 3/1986 | Hahn ................................ 294/26 X |
| 4,881,338 | 11/1989 | Lung . |
| 5,201,559 * | 4/1993 | Boring et al. ..................... 294/26 X |
| 5,487,576 * | 1/1996 | DuVivier ........................... 294/26 X |
| 5,575,052 * | 11/1996 | Thoresen .......................... 294/26 X |

* cited by examiner

Primary Examiner—Johnny D. Cherry

(57) ABSTRACT

A telescoping hook device for retrieving and manipulating items out of reach. The telescoping hook device includes a rod. The rod is elongate and has a first end and a second end. The rod is a telescoping rod such that the rod is selectively extendable between a compact position and an extended position. The rod comprises a plurality of portions. Each of the portions has a distal end and a proximal end. Each of the portions is adapted to extend into the proximal end of a next adjacent portion. A first of the portions defines a handle portion. A hook member is integrally coupled to a proximal end of a last of the portions.

11 Claims, 1 Drawing Sheet

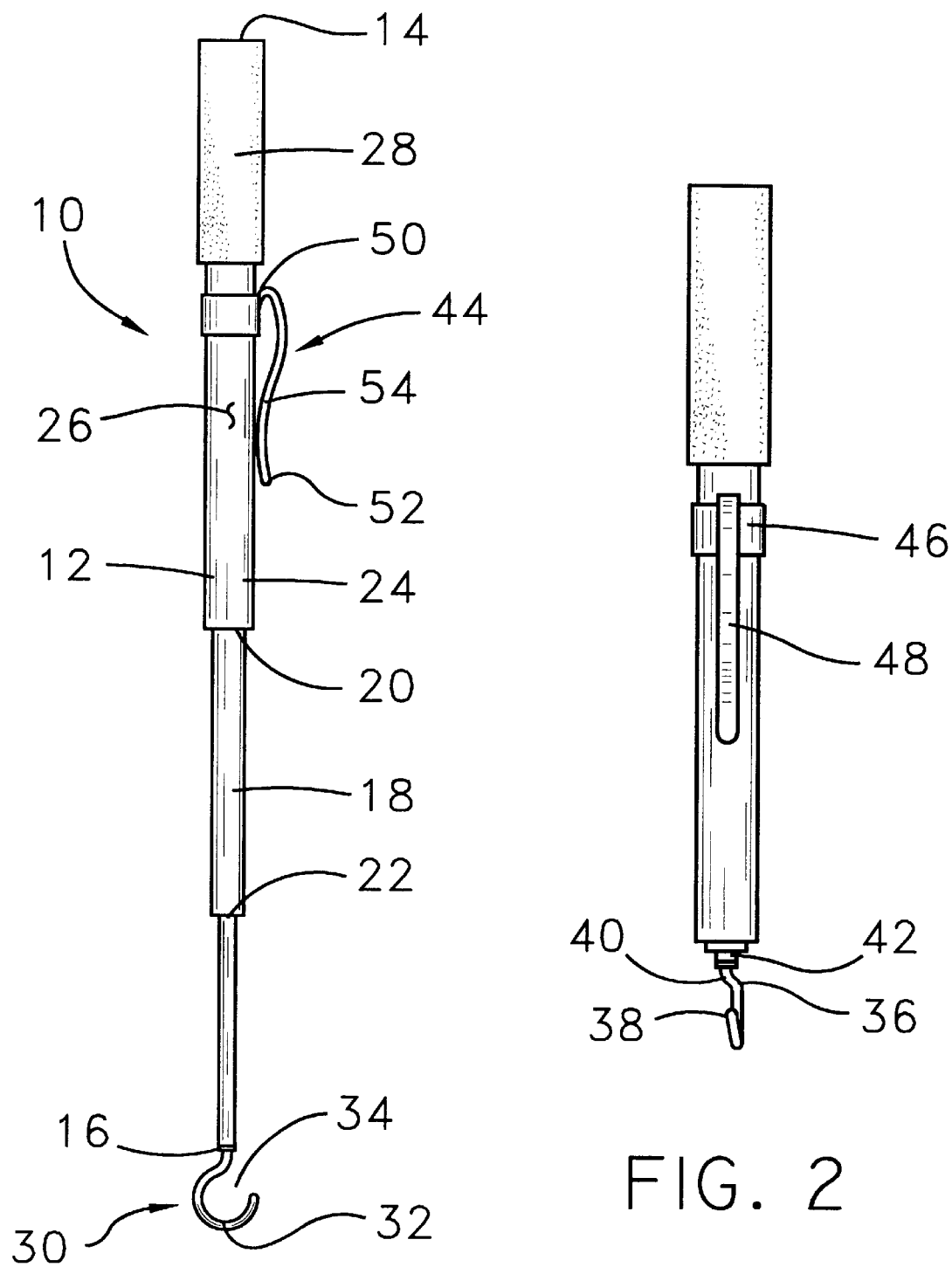

TELESCOPING HOOK DEVICE

BACKGROUND OF THE INVENTION

1. Field of the Invention

The present invention relates to hook devices and more particularly pertains to a new telescoping hook device for retrieving and manipulating items out of reach.

2. Description of the Prior Art

The use of hook devices is known in the prior art. More specifically, hook devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,881,338; U.S. Pat. No. 4,547,989; U.S. Pat. No. 4,160,563; U.S. Pat. No. 2,372,743; U.S. Pat. No. 1,686,889; and U.S. Des. Pat. No. 385,009.

While these devices fulfill their respective, particular objectives and requirements, the aforementioned patents do not disclose a new telescoping hook device. The inventive device includes a rod. The rod is elongate and has a first end and a second end. The rod is a telescoping rod such that the rod is selectively extendable between a compact position and an extended position. The rod comprises a plurality of portions. Each of the portions has a distal end and a proximal end. Each of the portions is adapted to extend into the proximal end of a next adjacent portion. A first of the portions defines a handle portion. A hook member is integrally coupled to a proximal end of a last of the portions.

In these respects, the telescoping hook device according to the present invention substantially departs from the conventional concepts and designs of the prior art, and in so doing provides an apparatus primarily developed for the purpose of retrieving and manipulating items out of reach.

SUMMARY OF THE INVENTION

In view of the foregoing disadvantages inherent in the known types of hook devices now present in the prior art, the present invention provides a new telescoping hook device construction wherein the same can be utilized for retrieving and manipulating items out of reach.

The general purpose of the present invention, which will be described subsequently in greater detail, is to provide a new telescoping hook device apparatus and method which has many of the advantages of the hook devices mentioned heretofore and many novel features that result in a new telescoping hook device which is not anticipated, rendered obvious, suggested, or even implied by any of the prior art hook devices, either alone or in any combination thereof.

To attain this, the present invention generally comprises a rod. The rod is elongate and has a first end and a second end. The rod is a telescoping rod such that the rod is selectively extendable between a compact position and an extended position. The rod comprises a plurality of portions. Each of the portions has a distal end and a proximal end. Each of the portions is adapted to extend into the proximal end of a next adjacent portion. A first of the portions defines a handle portion. A hook member is integrally coupled to a proximal end of a last of the portions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new telescoping hook device apparatus and method which has many of the advantages of the hook devices mentioned heretofore and many novel features that result in a new telescoping hook device which is not anticipated, rendered obvious, suggested, or even implied by any of the prior art hook devices, either alone or in any combination thereof.

It is another object of the present invention to provide a new telescoping hook device which may be easily and efficiently manufactured and marketed.

It is a further object of the present invention to provide a new telescoping hook device which is of a durable and reliable construction.

An even further object of the present invention is to provide a new telescoping hook device which is susceptible of a low cost of manufacture with regard to both materials and labor, and which accordingly is then susceptible of low prices of sale to the consuming public, thereby making such telescoping hook device economically available to the buying public.

Still yet another object of the present invention is to provide a new telescoping hook device which provides in the apparatuses and methods of the prior art some of the advantages thereof, while simultaneously overcoming some of the disadvantages normally associated therewith.

Still another object of the present invention is to provide a new telescoping hook device for retrieving and manipulating items out of reach.

Yet another object of the present invention is to provide a new telescoping hook device which includes a rod. The rod is elongate and has a first end and a second end. The rod is a telescoping rod such that the rod is selectively extendable between a compact position and an extended position. The rod comprises a plurality of portions. Each of the portions has a distal end and a proximal end. Each of the portions is adapted to extend into the proximal end of a next adjacent portion. A first of the portions defines a handle portion. A hook member is integrally coupled to a proximal end of a last of the portions.

Still yet another object of the present invention is to provide a new telescoping hook device that allows a user to pick up items such as purses which may cause back stress.

Even still another object of the present invention is to provide a new telescoping hook device that allows a user to manipulate items on shelves which may not be reachable and stores in a compact position after use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new telescoping hook device according to the present invention.

FIG. 2 is a schematic side view of the present invention in a compact position.

DESCRIPTION OF THE PREFERRED EMBODIMENT

With reference now to the drawings, and in particular to FIGS. 1 and 2 thereof, a new telescoping hook device embodying the principles and concepts of the present invention and generally designated by the reference numeral 10 will be described.

As best illustrated in FIGS. 1 and 2, the telescoping hook device 10 generally comprises a rod 12. The rod 12 is elongate and has a first end 14 and a second end 16. The rod 12 is a telescoping rod such that the rod is selectively extendable between a compact position, FIG. 2, and an extended position, FIG. 1. The rod 12 comprises a plurality of portions 18. Each of the portions 18 has a distal end 20 and a proximal end 22. Each of the portions 18 is adapted to extend into the proximal end 22 of a next adjacent portion 18 such as in a conventional antenna. A first of the portions defines a handle portion 24. The handle portion 24 has an exterior surface 26. A gripping means 28 for gripping the handle portion 24 is securely attached to the exterior surface 26. The gripping means 28 preferably comprises an elastomeric material. Ideally, the elastomeric material is blown such as conventional foam rubber. Preferably, there are at least three portions 18. The extended position of the rod 12, as shown in FIG. 1, preferably has a length greater than fifteen inches and no longer than forty inches. The rod 12 preferably comprises a metal.

A hook member 30 comprises an annular member 32 having a break 34 therein. The annular member 32 has a first end 36 and a second end 38. An end of a bar 40 is integrally coupled to the first end 36 of the annular member 32. The bar 40 is angled with respect to a plane of the annular member 32 such that the bar is not within a plane of the annular member. A free end of the bar 40 is integrally coupled to the proximal end 22 of a last 42 of the portions. The plane of the annular member 32 is orientated generally parallel to a longitudinal axis of the rod 12 such that the annular member 32 is offset from the longitudinal axis as is depicted in FIG. 2.

A coupling means 44 couples the rod to a user. The coupling means 44 includes a ring member 46. The ring member 46 is securely attached to the first portion 24 such that the first portion 24 extends through the ring member 46. A clip portion 48 comprises an elongate member having a first end 50 and a second end 52. The first end 50 is integrally coupled to the ring member 46. The clip portion 48 has a generally S-shape such that a portion 54 of the clip portion 48 abuts the first portion 24. The clip portion 48 preferably comprises a generally resiliently flexible material such as metal or plastic. The clip portion 48 may be inserted into a flap of a pocket to hold the device to a user.

In use, the rod 12 is extended when a person wishes to pick up an item, such as a purse, or to manipulate items out of reach. The hook member 30 is slightly offset for better viewing of the object being manipulated and to easier allow the second end 38 of the annular member 32 to grab an object without the proximal end 22 of the last portion 42 interfering.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A telescoping hook device, said device comprising:
   a rod, said rod being elongate and having a first end and a second end, said rod being a telescoping rod such that said rod is selectively extendable between a compact position and an extended position, said rod comprising a plurality of portions, each of said portions having a distal end and a proximal end, each of said portions extending into said proximal end of a next adjacent portion, a first of said portions defining a handle portion; and
   a hook member, said hook member being integrally coupled to a proximal end of a last of said portions;
   wherein said hook member has a break therein and a first end and a second end, an end of a bar being integrally coupled to said first end of said hook member, a free end of said bar being integrally coupled to said proximal end of said last portion;
   wherein said hook member further comprises said bar being angled with respect to a plane of said hook member such that said bar is not within a plane of said hook member, said plane of said hook member being orientated generally parallel to a longitudinal axis of said rod such that said hook member is offset from said longitudinal axis of said rod.

2. The telescoping hook device as in claim 1, wherein said rod further comprises:

said handle portion having an exterior surface, a gripping means for gripping said handle portion being securely attached to said exterior surface, said gripping means comprising an elastomeric material.

3. The telescoping hook device as in claim 1, wherein said extended position of said rod has a length greater than fifteen inches.

4. The telescoping hook device as in claim 1, further comprising:

a coupling means for coupling said rod to a user, said coupling means being securely attached to said rod.

5. The telescoping hook device as in claim 4, wherein said coupling means comprises:

a ring member, said ring member being securely attached to said first portion such that said first portion extends through said ring member; and a clip portion, said clip portion comprising an elongate member, said elongate member having a first end and a second end, said first end being integrally coupled to said ring member, said clip portion having a generally S-shape such that a portion of said clip portion abuts said first portion, said clip portion comprising a generally resiliently flexible material.

6. A telescoping hook device, said device comprising:

a rod, said rod being elongate and having a first end and a second end, said rod being a telescoping rod such that said rod is selectively extendable between a compact position and an extended position, said rod comprising a plurality of portions, each of said portions having a distal end and a proximal end, each of said portions extending into said proximal end of a next adjacent portion, a first of said portions defining a handle portion, said handle portion having an exterior surface, a gripping means for gripping said handle portion being securely attached to said exterior surface, said gripping means comprising an elastomeric material, said elastomeric material being blown, wherein there are at least three of said portions, said extended position of said rod having a length greater than fifteen inches, said rod comprising a metal;

a hook member having a break therein, said hook member having a first end and a second end, an end of a bar being integrally coupled to said first end of said hook member, said bar being angled with respect to a plane of said hook member such that said bar is not within a plane of said hook member, a free end of said bar being integrally coupled to the proximal end of a last of said portions, said plane of said hook member being orientated generally parallel to a longitudinal axis of said rod such that said hook member is offset from said longitudinal axis;

a coupling means for coupling said rod to a user, said coupling means comprising:

a ring member, said ring member being securely attached to said first portion such that said first portion extends through said ring member; and a clip portion, said clip portion comprising an elongate member, said elongate member having a first end and a second end, said first end being integrally coupled to said ring member, said clip portion having a generally Sshape such that a portion of said clip portion abuts said first portion, said clip portion comprising a generally resiliently flexible material.

7. A telescoping hook device, said device comprising:

an elongate rod having a first end and a second end, said rod comprising a plurality of portions to form a telescoping rod selectively extendable between a compact position and an extended position, a first one of said portions defining a handle portion;

a hook member coupled to a proximal end of a last one of said portions, said hook member having a first end and a second end;

a bar having a first end coupled to said first end of said hook member and a second end coupled to said proximal end of said last portion of said rod; and wherein said hook member generally lies in a plane oriented generally parallel to and offset from a longitudinal axis of said rod.

8. The telescoping hook device as in claim 7, wherein said handle portion of said rod has an exterior surface, a gripping means for gripping said handle portion being attached to said exterior surface, said gripping means comprising an elastomeric material.

9. The telescoping hook device as in claim 7, wherein said extended position of said rod has a length greater than fifteen inches.

10. The telescoping hook device as in claim 7, further comprising a coupling means for coupling said rod to a user, said coupling means being securely attached to said rod.

11. The telescoping hook device as in claim 10, wherein said coupling means comprises a ring member attached to said first portion such that said first portion extends through said ring member; and a clip portion comprising an elongate member, said elongate member having a first end and a second end, said first end being integrally coupled to said ring member, said clip portion having a generally S-shape such that a portion of said clip portion abuts said first portion, said clip portion comprising a generally resiliently flexible material.

\* \* \* \* \*